(12) United States Patent
Avery

(10) Patent No.: US 7,122,066 B2
(45) Date of Patent: Oct. 17, 2006

(54) AIR FILTER SYSTEM

(75) Inventor: Neal H. Avery, Mission Viejo, CA (US)

(73) Assignee: Avertech, Inc., Mission Viejo, CA (US)

( * ) Notice: Subject to any disclaimer, the term of this patent is extended or adjusted under 35 U.S.C. 154(b) by 87 days.

(21) Appl. No.: 10/807,631

(22) Filed: Mar. 23, 2004

(65) Prior Publication Data

US 2004/0211161 A1    Oct. 28, 2004

Related U.S. Application Data

(63) Continuation-in-part of application No. 10/621,076, filed on Jul. 15, 2003, now abandoned, which is a continuation of application No. 09/633,369, filed on Aug. 7, 2000, now Pat. No. 6,610,116.

(51) Int. Cl.
*B01D 46/00* (2006.01)

(52) U.S. Cl. .................. 55/385.1; 55/503; 55/504; 55/505; 454/154; 454/158

(58) Field of Classification Search ............. 55/385.1, 55/503, 504, 505, 306, 490, 493, 502, 391, 55/497, 511, DIG. 31; 454/154, 158
See application file for complete search history.

(56) References Cited

U.S. PATENT DOCUMENTS

| | | | |
|---|---|---|---|
| 3,366,362 A | 1/1968 | Hogan et al. |
| 3,686,835 A | 8/1972 | Strange et al. |
| 4,148,732 A | 4/1979 | Burrow et al. |
| 4,722,747 A | 2/1988 | Armbruster |
| 4,889,542 A | 12/1989 | Hayes |
| D306,340 S | 2/1990 | Whiting |
| 5,127,876 A | 7/1992 | Howe et al. |
| 5,141,539 A | 8/1992 | Hiouani |
| 5,328,152 A | 7/1994 | Castle |
| 5,370,576 A | 12/1994 | Krofchalk |
| 5,399,119 A | 3/1995 | Birk et al. |
| 5,545,241 A | 8/1996 | Vanderauwera et al. |
| 5,554,205 A | 9/1996 | Ernst et al. |
| 5,567,230 A | 10/1996 | Sinclair |
| 5,912,369 A | 6/1999 | Reeves |
| 6,001,145 A | 12/1999 | Hammes |
| 6,019,676 A | 2/2000 | Kim |
| 6,093,227 A | 7/2000 | Benasutti |
| 6,139,607 A | 10/2000 | Coulonvaux |
| 6,210,457 B1 | 4/2001 | Siemers |

OTHER PUBLICATIONS

Webster's Ninth New Collegiate Dictionary, by Merriam-Webster, 1991, p. 245.

*Primary Examiner*—Duane Smith
*Assistant Examiner*—Minh-Chau T. Pham
(74) *Attorney, Agent, or Firm*—Christie, Parker & Hale, LLP

(57) ABSTRACT

An air filter system for use by airline passengers on commercial airlines and the like. The housing is configured to clamp to the gasper air supply nozzle of the airliner. The housing is configured to direct air from the air supply nozzle through the filter medium. Thus, the present invention provides a filter which may easily be installed by an airline passenger so as to mitigate airborne contaminants from the air supply nozzle of the airliner. The air filter system provides a flow of comparatively clean air to the passenger and the flow of comparatively clean air directs undesirable airborne contaminants found within the passenger cabin of the airliner away from the passenger, thus forming a region of comparatively clean air generally around the passenger.

50 Claims, 7 Drawing Sheets

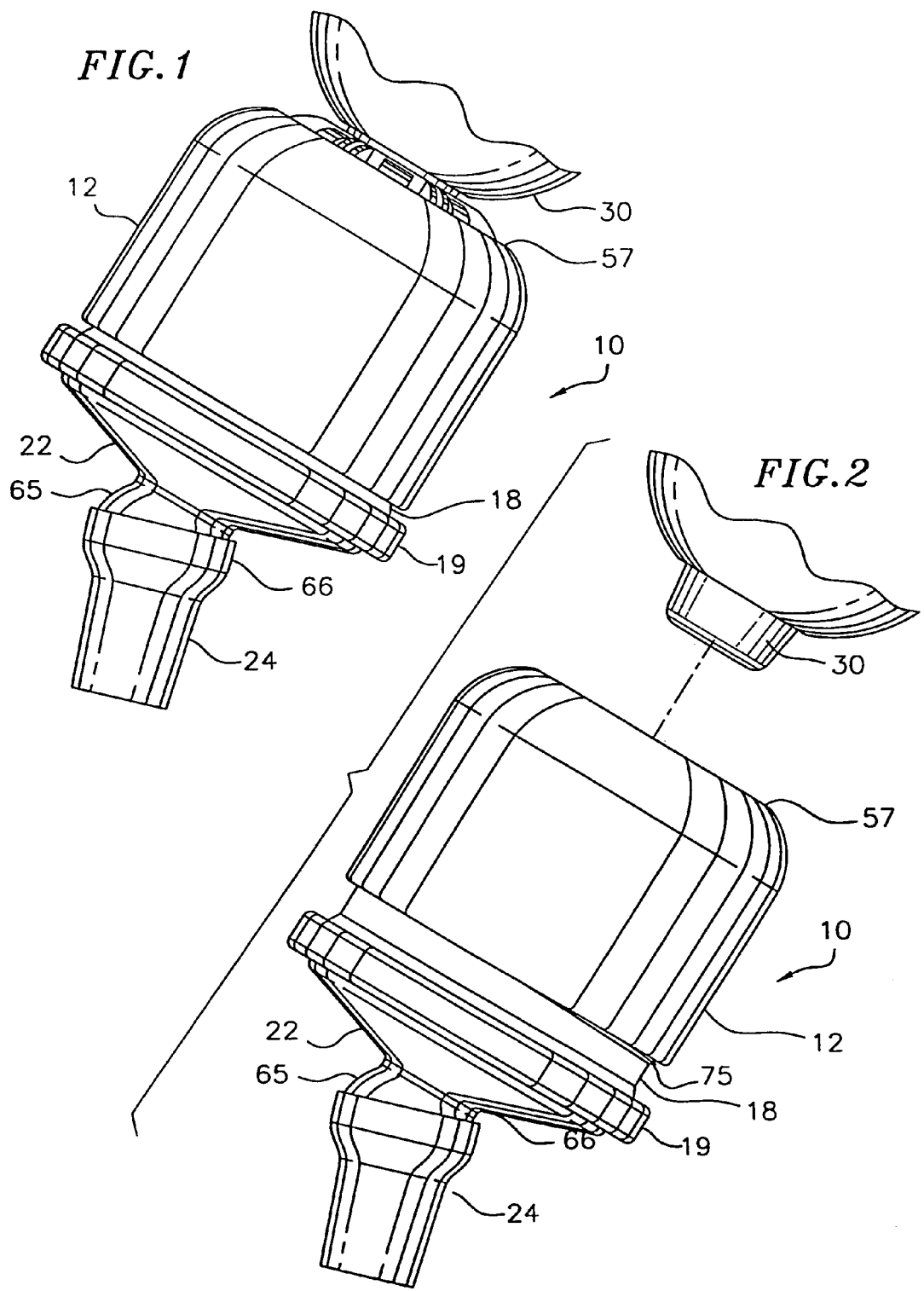

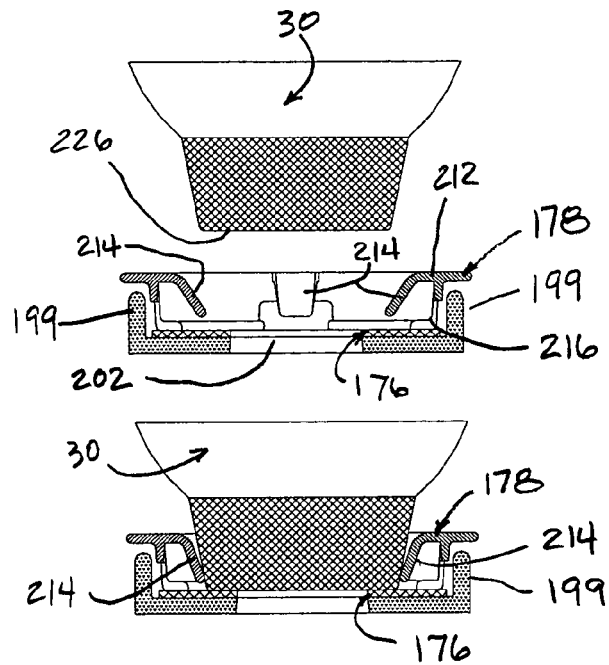
FIG. 9
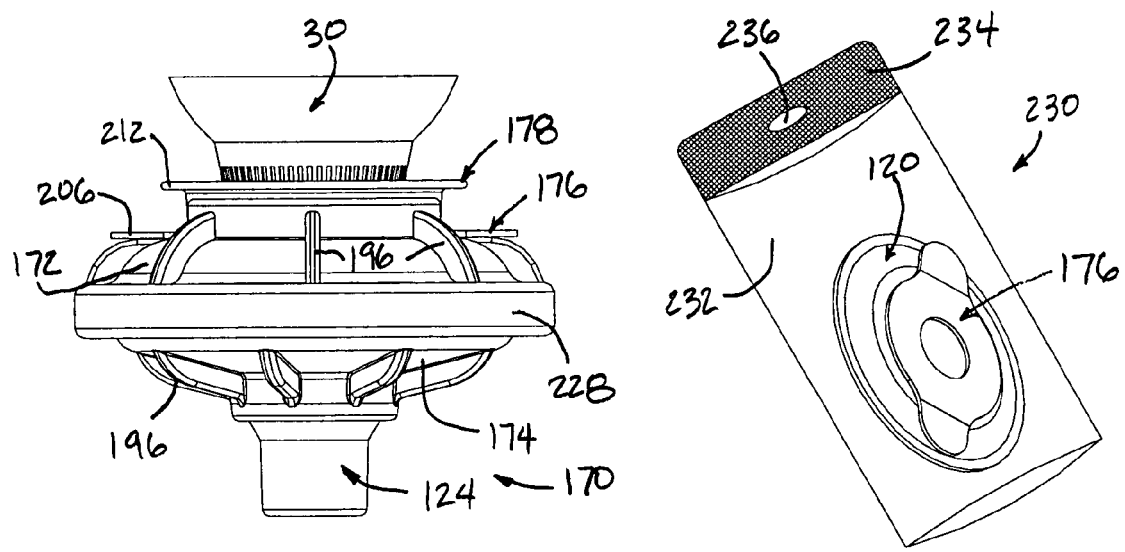
FIG. 10
FIG. 11

AIR FILTER SYSTEM

CROSS-REFERENCE TO RELATED APPLICATIONS

This is a continuation-in-part of application Ser. No. 10/621,076, filed Jul. 15, 2003 now abandoned, which is a continuation of application Ser. No. 09/633,369, filed Aug. 7, 2000, now U.S. Pat. No. 6,610,116, the contents of which are expressly incorporated herein by reference.

FIELD OF THE INVENTION

The present invention relates generally to fluid filters. The present invention relates more particularly to an air filter system for mitigating the exposure of a passenger to undesirable airborne particulate and/or chemical substances.

BACKGROUND OF THE INVENTION

Modern passenger aircraft, such as commercial jet airliners, commonly include a passenger support unit (PSU) located generally above each passenger's seat. The PSU typically includes a reading light, an air supply nozzle and an emergency oxygen mask for each passenger. The air supply nozzle facilitates control of the quantity and direction of air provided to the passenger.

Such contemporary air supply nozzles are typically adjusted by the passenger, so as to direct a stream of air upon the passenger's face and/or torso. This stream of air is refreshing and is intended to enhance the comfort of the passenger.

Although such contemporary air supply nozzles do typically enhance the comfort of a passenger during flight, such contemporary air supply nozzles suffer from inherent deficiencies which tend to detract from their overall utility. For example, the air flowing through an air supply nozzle and being directed toward the face of a passenger may contain undesirable airborne contaminants such as germs, dust and pollen.

The air circulation system of a commercial airliner typically has a particulate filter incorporated therein. However, such filters must be changed periodically in order to maintain their effectiveness. Although both the Federal Aviation Administration (FAA) and the aircraft manufacturer provide guidelines regarding the frequency with which aircraft air recirculation filters must be changed, there is no assurance that the airlines actually follow such guidelines.

Indeed, there is generally a substantial incentive for airline companies to disregard such guidelines, since more frequent filter replacement is costly, not only in terms of parts and labor but also in terms of the down time of the aircraft incurring such maintenance (during which the aircraft is clearly not contributing to the revenue of the airline).

There are documented cases of germs being transmitted among passengers during an airline flight. For example, in one incident reported by the Centers for Disease Control and Prevention, six of 257 passengers contracted tuberculosis, presumably from a single inflected passenger aboard the airliner.

As a further example, an airliner containing one person who had the flu was known to sit on the ground for approximately three hours. Three days later, 38 of the 54 people aboard the aircraft had contracted the flu.

Anecdotal evidence of this sort is abundant. Moreover, it is not difficult to understand that when a number of people are crowded together into a comparatively small space, such as that afforded by a commercial airliner, airborne contagiums will tend to be transmitted from one passenger to another.

In view of the foregoing, it is desirable to provide an air filter system which mitigates the exposure of a passenger to undesirable airborne contaminants. More particularly, it is desirable to provide such an air filter system which is configured so that a passenger may install and utilize the air filter system personally, so as to assure the adequacy of the filtration afforded thereby.

SUMMARY

The present invention specifically addresses and alleviates the above mentioned deficiencies associated with the prior art. More particularly, the present invention comprises an air filter system having a housing and a filter medium. The housing is configured to clamp to an air supply nozzle, such as that of a commercial airliner.

As discussed in detail below, the air supply gasper nozzles of different airliners vary considerably in their configuration or geometry. In order to enhance the utility of the present invention, the air filter system is configured so as to clamp onto a wide range of nozzle geometries utilizing a single embodiment thereof.

As used herein, the term clamp is defined to include attachment by urging together at least two generally opposed members of a first device (such as the air filter system of the present invention) so as to capture and grasp a second device (such as an air supply nozzle). Thus, according to the present invention, the term clamping includes grasping by a plurality of generally opposed fingers, as discussed in detail below. Those skilled in the art will appreciate that various other structures are likewise suitable for effecting such clamping. For example, clamping may alternatively be accomplished via a common hose clamp-like device or via any other similar structure. Moreover, clamping is defined herein so as to apply to any type of device which applies a compressive force to another device, so as to attach the two devices to one another.

The housing may be configured to clamp to any desired type of air supply nozzle, as discussed in detail below. According to one aspect of the present invention, the housing is configured to clamp to the air supply nozzle of a commercial airliner, so as to provide air to a passenger of the airliner in a manner which mitigates the exposure of the passenger to undesirable airborne contaminants. Further, since the housing is configured to be clamped to the air supply nozzle by the passenger, the passenger is assured of the adequacy of the filtration afforded thereby. That is, the passenger is able to assure proper operation of the air filter system by performing the necessary filter medium changes, as needed.

The housing is configured to direct air from the air supply nozzle through the filter medium, so as to remove undesirable airborne contaminants. In this manner, the undesirable transmission of contagiums and substances associated with allergies may be mitigated. Further, a substantial portion of other undesirable airborne contaminants may be removed. Indeed, carbon, ion-exchange resin, or another desired chemical filter medium may be included so as to mitigate the presence of undesirable chemical substances such as fuel, oil, or hydraulic fluid fumes. Thus, according to the present invention, cleaner, more pure air is provided to a passenger so as to enhance the passenger's comfort during flight and also so as to mitigate health risks which might otherwise be present during the flight.

The filtered air stream from the air filter system can be utilized to force unwanted airborne contaminants away from the passenger's breathing space. Thus, germs from the surrounding passengers, cabin dust and mold from inside the cabin can all be forced away from the passenger by utilizing the filtered air stream.

Preferably, the air filter system of the present invention comprises a collet which is configured to clamp to the air supply nozzle of an airliner. However, those skilled in the art will appreciate that various other means for clamping the housing to the air supply nozzle are likewise suitable.

As used herein, the term collet is defined to include any generally encircling or collar-like band, ferrule, flange or other device which comprises a plurality of fingers or finger-like projections which are capable of moving inwardly, so as to grasp an air supply nozzle.

According to the preferred embodiment of the present invention, the collet comprises a plurality of elongated independently articulated fingers which are movable inwardly so as to grasp the air supply nozzle of a commercial airliner. The collet is preferably configured such that the fingers are movable inwardly so as to grasp a gasper nozzle of a commercial airliner. However, as those skilled in the art will appreciate, the collet may be configured such that the fingers thereof move inwardly so as to grasp any desired type of air supply nozzle.

A clamp sleeve preferably receives a portion of the housing and the clamp sleeve urges the plurality of fingers to move inwardly, so as to grasp the air supply nozzle, when the clamp sleeve is moved, e.g., when the clamp sleeve is rotated with respect to the housing. The clamp sleeve and the housing are preferably threadedly attached to one another and configured such that the plurality of fingers move inwardly when the clamp sleeve is rotated clockwise from the passenger's point of view. Thus, a passenger tightens the air filter system to the gasper nozzle by turning the clamp sleeve in the same direction, i.e., clockwise, that is used to screw a light bulb into a socket. Thus, the threads which attach the clamp sleeve to the housing preferably comprise left-handed threads. Alternatively, right-handed threads may be used.

An opening is preferably formed in the clamp sleeve and the opening is configured so as to urge the fingers inwardly toward the air supply nozzle such that a distal portion of the fingers effect engagement with the air supply nozzle, so as to removably attach the housing to the air supply nozzle.

Preferably, a resilient clamp pad is formed to each finger, so as to enhance grasping of the air supply nozzle by the fingers. Each resilient clamp pad is preferably formed of molded polymer or elastomeric material such as silicone or urethane. However, those skilled in the art will appreciate that various other materials are likewise suitable for forming the resilient clamp pad. For example, the resilient clamp pad may alternatively be formed from cork, felt, or leather, as well as various different fabric and fiber materials.

The housing preferably comprises an air inlet port and an air outlet port. The filter medium is mounted within the housing such that air entering the housing via the air inlet port is filtered by the filter medium prior to the air exiting the housing via the air outlet port. Alternatively, the filter medium may be attached to the outside of the housing, such that the filter medium covers the air outlet port thereof, for example.

The housing preferably comprises a separable two part housing defining first and second housing sections thereof. The first and second housing sections of the two-part housing preferably attach to one another via a plurality of bayonet detents to facilitate quick and convenient separation and attachment thereof. As used herein, the term bayonet detent is defined to include a detent which locks two items to one another when one of the items is pushed toward the other item and then rotated with respect to the other item, such as the type of detent commonly used to attach a bayonet to a rifle barrel.

Alternatively, various other means of attaching the first and second housing sections together may be utilized. For example, the first and second housing sections may be threadedly attached to one another. As a further alternative, fasteners, such as nuts, bolts, screws, etc., may be utilized to attach the first and second housing sections to one another. Indeed, any method which facilitates the convenient changing of a filter medium disposed within the housing may be utilized to attach the first and second housing sections to one another.

Separation of the first and second sections of the two-part housing facilitates removal and replacement of the filter medium. The filter medium is preferably disposed within the housing such that the filter medium is held in place by the first and second sections thereof.

The filter medium preferably comprises a disposable filter medium, such that the disposable filter medium may be removed and replaced with respect to the housing when or before the effectiveness of the disposable filter medium is reduced substantially due to use. The filter medium preferably comprises an electrostatically charged, polypropylene, non-woven membrane.

Alternatively, the housing may be sealed, i.e., not easily opened, and the air filter system may be considered disposable. That is, rather than change the filter medium when the filter medium is no longer adequate for removing airborne contaminants from the air passing therethrough, a new air filter system is used. The new air filter system may utilize the clamping mechanism of the old air filter system or, alternatively, may include a dedicated, disposable clamp mechanism of its own.

A seal, preferably formed of a resilient polymer foam material, is optionally disposed proximate an air inlet port of the housing and is configured to mitigate air leakage intermediate the housing and the air supply nozzle when the housing is clamped to the air supply nozzle. That is, the seal is positioned upon the housing and is configured such that attachment of the housing to the air supply nozzle effects at least some compression of the seal, such that air leakage between the seal and the air supply nozzle is mitigated. Preferably, the seal is attached, e.g., via adhesive bonding, to the housing.

Preferably, an air outlet nozzle is pivotally attached to the housing so as to facilitate aiming of air exiting the housing. The air outlet nozzle of the housing mimics, to some degree, the aimable air outlet nozzle of the airliner. This may be desirable since, in some instances, the air filter system 10 of the present invention may inhibit aiming of the gasper nozzle 30. Thus, even when the air filter system of the present invention is installed upon an air outlet nozzle of an airliner, the passenger may direct the air output therefrom as desired.

Pivotal attachment of the air outlet nozzle to the housing is preferably facilitated by forming a ball upon the housing, preferably surrounding the air exit port thereof. The air outlet nozzle defines a complementary socket which receives the ball, so as to facilitate aiming of air exiting the housing. Alternatively, the ball may be formed upon the air outlet nozzle and the socket then formed upon the housing.

Those skilled in the art will appreciate the various other means for facilitating aiming of air exiting the housing are likewise suitable.

A mounting assembly facilitates mounting of the housing to the air supply nozzle. The mounting assembly comprises the seal, the plurality of fingers defined by the collet, and the clamp sleeve.

Although use of the present invention is described and illustrated herein as being intended for the filtering of air from an airliner's air supply nozzle, those skilled in the art will appreciate that various other applications of the present invention are likewise suitable. For example, the air filter system of the present invention may similarly be utilized to filter air within the passenger compartment of various different types of vehicles, such as trains, buses, cars, trucks, boats, private aircraft and helicopters. Indeed, the present invention may be utilized to filter air in a wide variety of applications. Thus, discussion and illustration of the present invention as being specifically applicable to the filtering of air within an airliner is by way of example only and not by way of limitation.

The air filter system of the present invention may be formed substantially from a low cost, injection molded polymer material. Therefore, the air filter system of the present invention is inexpensive to manufacture and provides a low cost option for those airline passengers who are concerned about the presence of airborne contaminants aboard commercial airliners and the like. Since the air filter system of the present invention is simply clamped onto the existing gasper nozzle of a commercial airliner, such as via the aforementioned attachment mechanism, the air filter system of the present invention is convenient and easy to use.

According to an alternative configuration of the present invention, the housing is attached to a gasper nozzle via an adhesive, which is preferably formed upon a foam seal or gasket. According to this alternative configuration of the present invention, a passenger preferably merely removes a protective paper layer from the air inlet side of the housing, so as to expose an adhesive layer. The air filter system is then attached to the gasper nozzle by merely pushing the housing against the gasper nozzle, so as to effect adhesive bonding of the housing to the gasper nozzle.

Preferably, the adhesive and seal are formed such that the air filter system may be removed from the gasper nozzle without leaving a noticeable amount of adhesive thereon. Further, the adhesive and seal are preferably configured such that pulling a tab or the like of the seal effects removal of the air filter system from the gasper nozzle while also destroying the seal. Thus, the seal may be considered a one use only item. Additional seals may then be provided separately from the air filter system to facilitate reuse of the air filter system. 3M COMMAND ADHESIVE™ (a federally registered trademark of Minnesota Mining and Manufacturing Corporation of St. Paul, Minn.) is one example of such an adhesive coated seal.

Thus, the present invention provides an inexpensive and easy to use air filter system for mitigating exposure to undesirable airborne contaminants such as germs, dust and pollen which may be disseminated via a passenger's air supply nozzle on a commercial airliner or the like.

In accordance with another aspect of the present invention, there is provided an air filtration device for filtering air discharged from an air supply nozzle of a passenger compartment comprising a two part filter housing comprising an upper housing section, a lower housing section, an exterior surface and an interior surface defining an interior cavity; a filter media disposed in the interior cavity; an inlet nozzle disposed on the upper housing section, the inlet nozzle being defined by an opening in the upper housing section; an outlet nozzle disposed on the lower housing section; an adhesive foam pad comprising a passage opening bonded to a portion of the exterior surface of the upper housing section proximate the inlet nozzle; and a mounting guide for facilitating centering the passage opening of the adhesive foam pad with the inlet nozzle on the upper housing section.

In yet another aspect of the present invention, there is provided An air filtration device for filtering air discharged from an air supply nozzle of a passenger compartment assembled from the steps comprising obtaining a package container containing a replacement adhesive foam pad, said adhesive foam pad comprising a passage opening, a first surface, a second surface, and adhesive on at least a portion of the first surface and of the second surface; applying the replacement adhesive foam pad on a filter housing comprising an inlet opening located on a generally flat portion of an upper housing section; and wherein the adhesive foam pad is applied such that the passage opening of the adhesive foam pad generally aligns with the inlet opening of the upper housing section.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a semi-schematic, perspective view of the air filter system of the present invention installed upon an air supply nozzle via clamping;

FIG. 2 is a semi-schematic, perspective view of the air supply nozzle of FIG. 1, showing the air filter system removed from the air supply nozzle;

FIG. 9 is a semi-schematic partial cross-sectional view of an upper portion of the air filter system of FIG. 7 placed adjacent an air supply nozzle;

FIG. 10 is a semi-schematic side view of the air filter system of FIG. 7 in an assembled state and attached to an air supply nozzle; and FIG. 11 is a semi-schematic partial perspective view of a package container containing replacement components.

DETAILED DESCRIPTION

Figure 3:
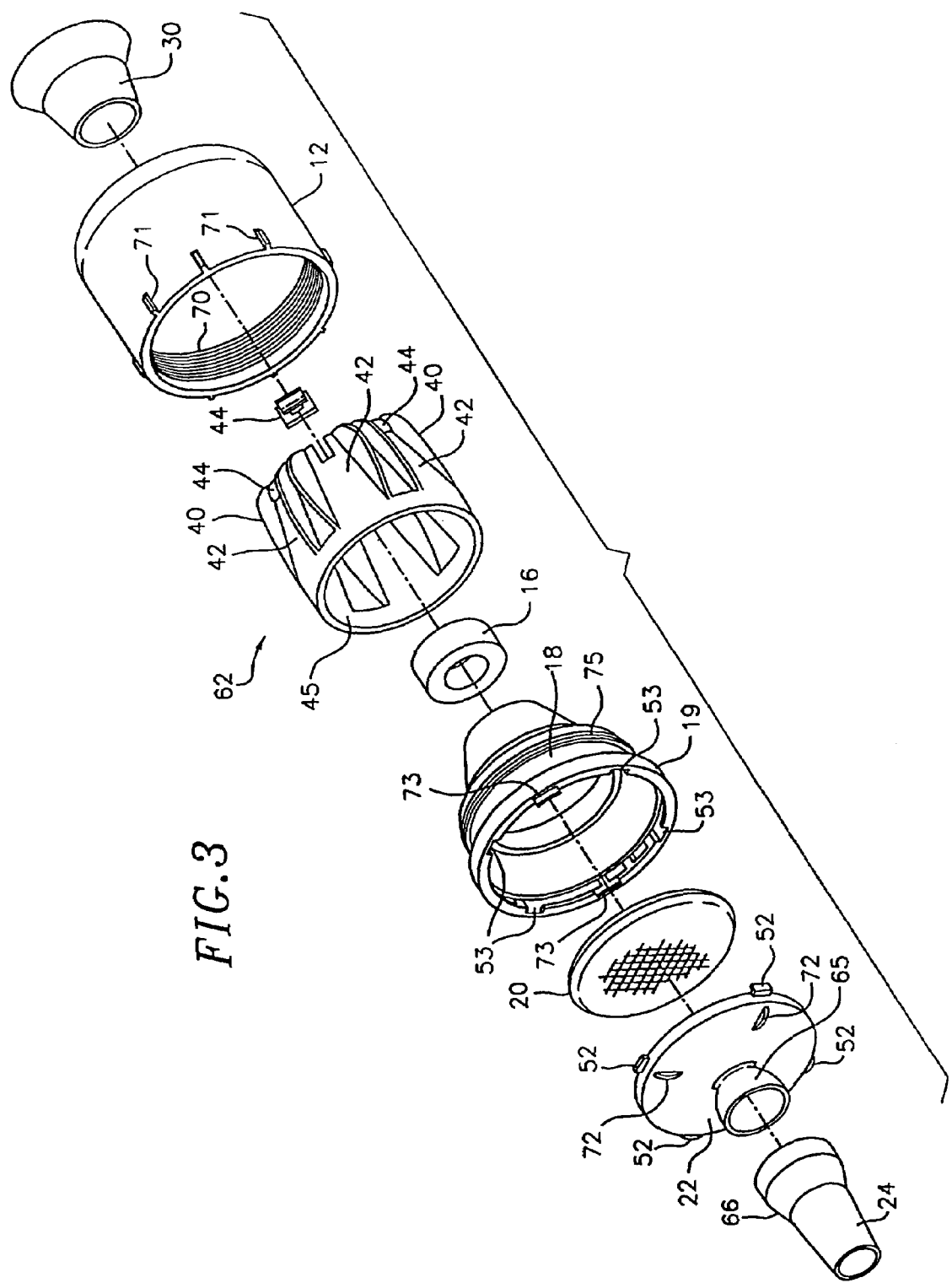
FIG. 3 is semi-schematic, perspective, exploded view of the air filter system of FIG. 1.

The detailed description set forth below in connection with the appended drawings is intended as a description of the presently preferred embodiment of the invention and is not intended to represent the only form in which the present invention may be constructed or utilized. The description sets forth the functions of the invention and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The present invention is shown in FIGS. 1–5, which depict a presently preferred embodiment thereof. Referring now to FIGS. 1 and 2, the air filter system 10 of the present invention may be mounted upon or attached to an air supply nozzle 30, such as the gasper nozzle of a commercial airliner. As those skilled in the art will appreciate, such gasper nozzles are commonly provided as a part of the passenger support unit (PSU) of a commercial airliner. Typically, each passenger has a dedicated gasper nozzle for providing a controlled flow of air to the passenger, so as to enhance the passenger's comfort during flight.

Such contemporary gasper nozzles are generally pivotally mounted (such as via a ball and socket arrangement) to the PSU such that they may be aimed by the passenger as desired, e.g., typically toward the passenger's head or torso. Air flow through the gasper nozzle may typically be adjusted by turning the gasper nozzle, which usually results in adjustment of a butterfly valve associated therewith.

However, as discussed in detail above, such air supply nozzles as the gasper nozzles of commercial airliners do not necessarily provide clean, uncontaminated air. Rather, it is not uncommon for the air provided by such air supply nozzles to be contaminated with airborne particulates and/or undesirable chemicals. These contaminants may result in the undesirable communication of disease, the aggravation of allergies and/or irritation and discomfort.

In order to mitigate the undesirable consequences of such airborne contaminants, while generally maintaining the desired comfort enhancing qualities associated with airline air supply nozzles, the air filter system 10 of the present invention is attached to the air supply nozzle, e.g., air supply nozzle 30, of an airliner. The air filter system 10 of the present invention contains a filter medium 20 (FIGS. 3 and 4) which, as discussed in detail below, tends to mitigate the presence of such undesirable airborne contaminants within the flow of air provided by the air supply nozzle 30. Further, the comparatively clean air output by the air filter system 10 tends to form an envelope or bubble of such comparatively clean air about the passenger at whom the output thereof is directed. This envelope or bubble of comparatively clean air tends to isolate the passenger from the adjacent, comparatively unclean air. Thus, the continuously flowing and filtered airstream of the air filter system 10 of the present invention desirably limits an airline passenger's exposure to germs and particulates found within the airliner's cabin.

Further, the air filter system 10 of the present invention comprises an air outlet nozzle 24 which facilitates directing of the air output therefrom in a desired direction, much in the same manner that air may be directed via a contemporary air supply nozzle 30.

According to the present invention, the air filter system 10 is attached to the air supply nozzle 30 via a mounting assembly which clamps the air filter system 10 to the air supply nozzle 30, as discussed in detail below.

Figure 4:
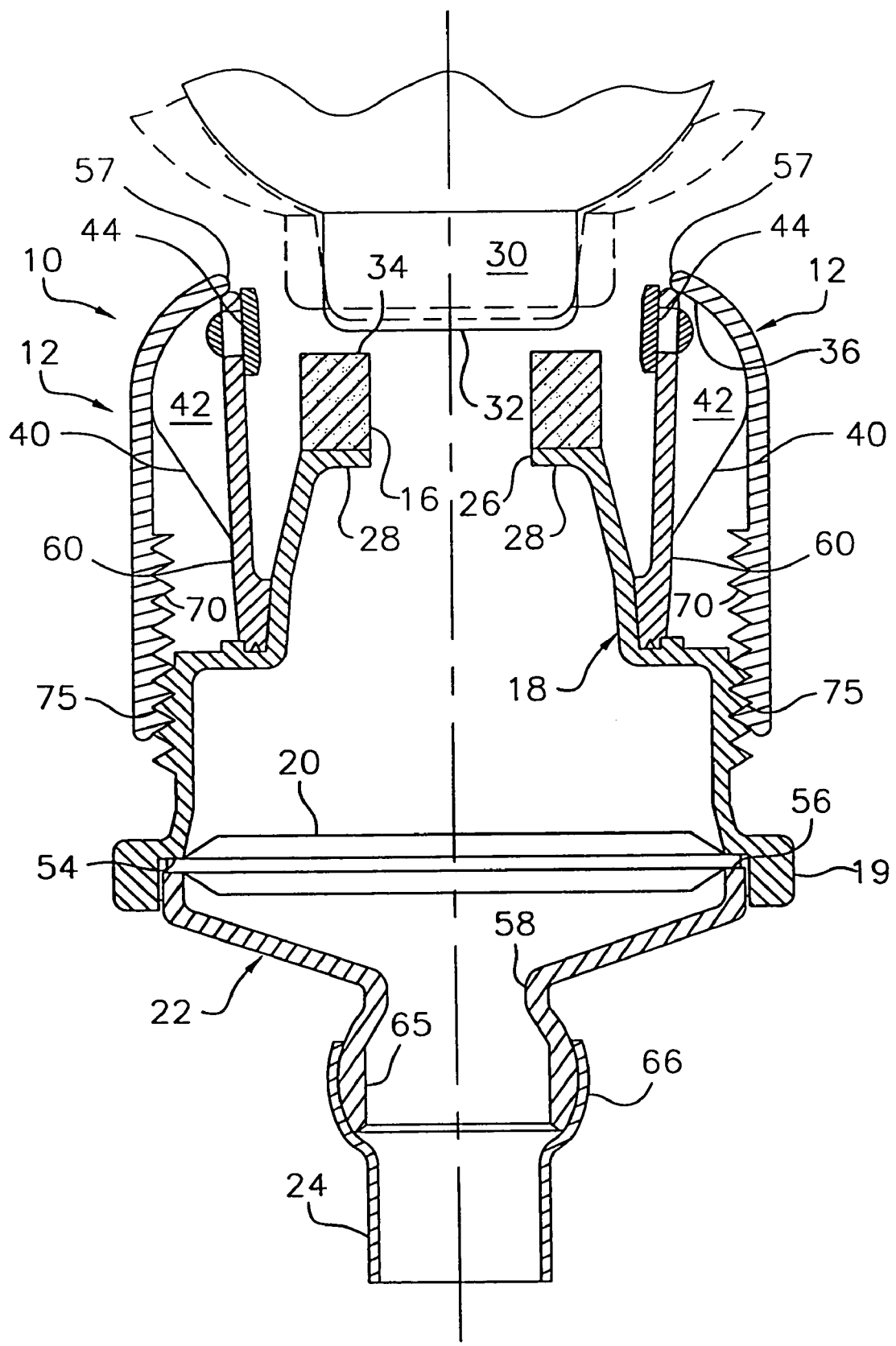
FIG. 4 is a semi-schematic, cross-sectional, side view of the air filter system of FIG. 1, showing that the housing is configured to clamp to a variety of different air supply nozzle configurations.
Figure 5:
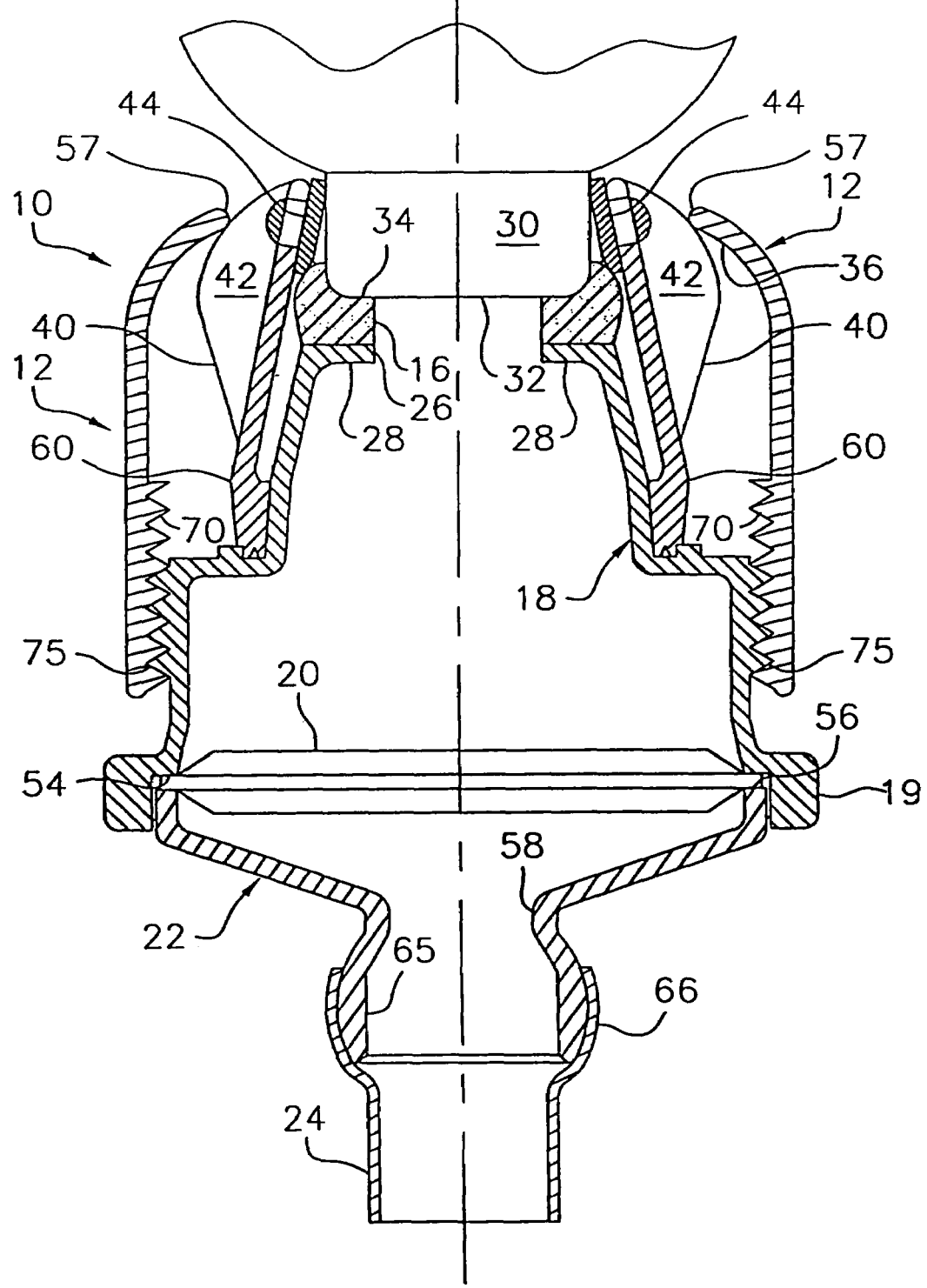
FIG. 5 is a semi-schematic, cross-sectional, side view of the air filter system of FIG. 1, showing the housing clamped to an air supply nozzle.

Referring now to FIGS. 3–5, the air filter system 10 of the present invention more particularly comprises a housing, which is preferably comprised of a first housing section 18 and a second housing section 22. The first housing section 18 has an inlet port 26 formed therein and, similarly, the second housing section 22 has an air outlet opening 58 formed therein. The first housing section 18 and second housing section 22 are separably attached to one another so as to facilitate the easy and convenient placement and holding of the filter medium 20 therebetween, i.e., within the housing defined thereby. According to the preferred embodiment of the present invention, a plurality of male bayonet detents 52 are formed upon the second housing section 22 and a complementary plurality of female bayonet detents are formed upon the first housing section 18, such that the first 18 and second 22 housing sections may be attached to one another by pushing the second housing section 22 into the first housing section 18 and then rotating the second housing section 22 slightly with respect to the first housing section 18, so as to engage the male bayonet detents 52 to the female bayonet detents 53.

Optional alignment tabs 73 facilitate alignment of the second housing section 22 with respect to the first housing section 18 during assembly of the second housing section 22 to the first housing section 18. As those skilled in the art will appreciate, various such alignment tabs and/or slots may similarly be utilized to facilitate assembly of the various different components of the present invention utilizing contemporary automation processes.

Alternatively, the first 18 and second 22 housing sections may be removably attached to one another by any other desired method. Those skilled in the art will appreciate that various other means, e.g., threads or fasteners such as nuts, bolts and/or screws, may be utilized to effect attachment of the first 18 and second 22 housing sections to one another.

As a further alternative, the first and second housing sections may be permanently attached to one another and the air filter system of the present invention may then be considered disposable, as discussed above.

As yet a further alternative, the filter element may be attached to the outside of the housing, such as over the air outlet port 58 thereof, or may otherwise be replaceable without requiring disassembly of the housing.

The filter medium 20 preferably comprises a thin, generally circular filter element which becomes clamped or captured between the first 18 and second 22 housing sections when the first 18 and second 22 housing sections are attached to one another. The first housing section 18 has a shoulder 54 (FIG. 4) formed thereon and the second housing 22 has a generally complementary shoulder 56 formed thereon. The first 54 and second 56 shoulders are preferably configured so as to have approximately the same diameter and so as to be juxtaposed such that they capture and clamp the periphery of the filter medium 20 therebetween when the first 18 and second 22 housing sections are attached to one another. Those skilled in the art will appreciate that various other means for mounting the filter medium 20 within the housing are likewise suitable.

The filter medium 20 preferably comprises an electrostatically charged polypropylene non-woven membrane. However, those skilled in the art will appreciate that various other types of filter medium are likewise suitable.

According to the present invention, the air filter system 10 is attached to the air supply nozzle 30 by clamping the air filter system 10 thereto. More particularly, according to the present invention, the air filter system 10 is attached to the air supply nozzle 30 via a plurality of fingers 42 which are urged inwardly so as to grasp and hold the air supply nozzle 30 when a clamp sleeve 12 is moved with respect to the housing.

According to the preferred embodiment of the present invention, the clamp sleeve 12 is threadedly attached to the first housing section 18, such that rotating the clamp sleeve 12 with respect to the first housing section 18 in a manner which moves the clamp sleeve 12 toward the second housing section 22 causes the periphery of opening 57 (FIG. 4) to abut or cam against the fingers 42. More particularly, the periphery of opening 57 cams against the camming surface 40 of the fingers 42 in a manner which forces the fingers 42 inwardly against the air supply nozzle 30.

The outer ring 19 of the first housing section 18 and gripping tabs 72 formed upon the second housing section 22 cooperate to facilitate rotation of the second housing section 22 with respect to the first housing section 18, such as when the filter medium 20 is replaced. Changing of the filter medium 20 is accomplished by rotating the second housing section 22 via gripping tabs 72 while holding the first housing section 18 generally stationary via the outer ring 19 of the first housing section 18. In this manner, the second housing section 22 is separated from the first housing section 18 and the filter medium 20 may easily be removed and replaced.

The gripping tabs 71, as well as the outer ring 19 of the first housing section 18, may be used to facilitate installation of the air filter system 10 upon the gasper nozzle 30 of an airliner. That is, a passenger may hold the air filter assembly 10 by the outer ring 19 of the first housing section 18 while the clamp sleeve 12 is rotated via gripping tabs 71, so as to effect installation of the air filter system 10 upon the gasper nozzle 30.

Preferably, the clamp sleeve 12 is attached to the first housing section 18 by left-handed threads, such that rotating the clamp sleeve 12 clockwise (from a passenger's point of view when the air filter system 10 is being attached to the air supply nozzle 30) causes the clamp sleeve 12 to move toward the second housing section 22, so as to cause the fingers 42 to tighten against the air supply nozzle 30. Thus, the clamp sleeve 12 preferably comprises left-handed internal threads 70 which are complementary to left-handed external threads 75 formed upon the first housing 18.

Preferably, each of the fingers 42 has an elastomeric pad 44 formed proximate a distal end thereof, so as to enhance grasping of the air supply nozzle 30. The elastomeric pads 44 may be formed of any desired resilient material, as discussed in detail above.

Each of the fingers 42 is hingedly attached to the first housing section 18, such as via a living hinge formed at a proximal end thereof. Therefore, the distal end of each of the fingers 42 is independently articulated and may move radially inward and radially outward, so as to effect attachment and removal from the air supply nozzle 30, respectively. The living hinge 60 is preferably configured such that it spring biases of the fingers 42 radially outwardly.

As shown in FIG. 4, the clamp sleeve 12 and fingers 42 are configured to accommodate a variety of different configurations of the gasper or air supply nozzle 30. The clamp sleeve 12 and the fingers 42 are configured so as to facilitate a wide range of movement of the fingers 42 from the outboardmost position thereof to the inboardmost position thereof. Thus, the fingers 42 are capable of reliably attaching the air filter system 10 to various different air supply nozzles 30 found upon various different airliners.

A compressible seal 16 is preferably formed of a resilient polymer foam material such as non-reticulated urethane foam, one example of which is known as SUPER SEAL™, (a federally registered trademark of E. N. Murray Co. of Denver Colo.). Another suitable material for the seal 16 is polyether polyurethane foam, such as BLUE CONFOR™, (a federally registered trademark of Fomex of Linwood, Pa.). The seal 16 inhibits air leakage intermediate the first housing section 18 and the air supply nozzle 30. Like the elastomeric pads 44, the compressible seal 16 may be alternatively formed of any desired resilient material.

The seal 16 is preferably attached to the first housing section 18 at a shoulder 28 thereof formed about the periphery of inlet port 26. The seal 16 is preferably adhesively bonded to the shoulder 28. Alternatively, the seal 16 may be attached to the first housing section 18 via ultrasonic welding or any other desired method. As shown in FIG. 5 and discussed in detail below, the seal 16 is compressed between the air supply nozzle 30 and the shoulder 28 of the first housing section 18 when the air filter system 10 is attached to the air supply nozzle 30.

According to the preferred embodiment of the present invention, a clamp finger assembly collet 62 includes all of the fingers 42 formed in a generally circular or barrel-like fashion so as to have a unitary construction which facilitates easily handling and assembly thereof. More particularly, the collet 62 comprises a plurality of separate, independently articulated fingers 42 which are attached to an annular base 45 via living hinges 60. Since the individual fingers 42 are not attached to one another, the distal end of each finger 42 is free to move radially inwardly and radially outwardly as its dedicated living hinge bends.

The collet 62 preferably comprises a single injection molded assembly which is attached, such as via adhesive bonding, to the first housing section 18. Those skilled in the art will appreciate that various other means, e.g., such as ultrasonic welding, are likewise suitable for attaching the collet 62 to the first housing section 18.

Optionally, the air filter system 10 of the present invention further comprises a ball 65 formed about the air outlet opening 58 of the second housing section 22 and an air outlet nozzle 24 attached to the second housing section 22 via a socket 66 formed in the air outlet nozzle 24 which receives the ball 65. The air outlet nozzle 24 facilitates aiming of the air flow from the air filter system 10 in a desired direction.

The components of the air filter system 10, such as the first 18 and second 22 housing sections, the clamp sleeve 12, the collet 62 and the air outlet nozzle 24 are preferably formed via the injection molding of a rigid, durable polymer material. However, those skilled in the art will appreciate the various other manufacturing techniques and materials are likewise suitable.

Having described the structure of the air filter system in detail above, it may be beneficial to describe the operation thereof. To attach the air filter system 10 to an air supply nozzle 30, such as a gasper air supply nozzle of a commercial airliner, the clamp sleeve 12 is first rotated in a manner which moves the clamp sleeve 12 away from the second housing section 22 (preferably in a counter-clockwise direction as viewed by the passenger), thereby allowing the distal ends of the fingers 42 to spring radially outwardly, so as to increase the diameter of the opening defined by the distal ends of the fingers 42, such that the air supply nozzle 30 may easily be received therein. The air filter system 10 is then positioned upon the air supply nozzle 30 by receiving the air supply nozzle 30 within the opening defined by the distal ends of the fingers 42. The air filter system 10 is preferably forced onto the air supply nozzle 30 sufficiently so as to at least partially compress the seal 16, as shown in FIG. 5. With the seal 16 so compressed, the clamp sleeve 12 is rotated (preferably clockwise from the passenger's point of view) so as to cause the clamp sleeve 12 to move toward the second housing section 22, thus causing the periphery of the opening 57 of the clamp sleeve 12 to cam against the camming surface 40 of the fingers 42 in a manner which urges the distal ends of fingers 42 radially inwardly against the air supply nozzle 30, thus clamping the air filter system 10 to the air supply nozzle 30.

As the fingers 42 move inwardly against the air supply nozzle 30, the elastomeric pads 44 compress slightly against the air supply nozzle 30, thereby enhancing the grip of the fingers 42 against the air supply nozzle 30 and thus assuring reliable attachment of the air filter system to the air supply nozzle 30. After the clamp sleeve 12 has been tightened sufficiently to effect secure attachment of the air filter system 10 to the air supply nozzle 30, then the air outlet nozzle 24 of the air filter system 10 may be aimed so as to direct air flow in a desired direction. The air filter system 10 of the present invention may be rotated, so as to similarly effect rotation of the air supply nozzle 30 in order to adjust the amount of air flow. Thus, the direction and amount of air flow may be adjusted to enhance comfort of the passenger and/or to form a curtain, bubble or other barrier about the passenger which is comprised of the cleaner air from the air filter system 10 and which thus mitigates exposure of the passenger to less clean air within the cabin of the airliner. Thus, the air filter system 10 of the present invention provides a flow of comparatively clean air to the passenger and the flow of comparatively clean air directs undesirable airborne contaminants found within the passenger compartment of the airliner away from the passenger, thus forming a region of comparatively clean air generally around the passenger.

Removal of the air filter system 10 from the air supply nozzle 30 is essentially just a reversal of the above-described installation process. Thus, the passenger merely rotates the clamp sleeve 12 in a direction which moves the clamp sleeve 12 away from the second housing section 22 (preferably in a counterclockwise direction as viewed by the passenger). Such rotation of the clamp sleeve 12 allows the distal ends of the fingers 42 to move radially outwardly, thus releasing their grip upon the air supply nozzle 30 and allowing the air filter system 10 to easily be removed from the air supply nozzle 30.

The clamp sleeve 12 and the second housing section 22 are preferably comprised of clear polystyrene, such as KRO1 Clear Philips. Alternatively, the clamp sleeve 12 and the second housing section 22 are comprised of either ABS or polycarbonate ABS.

The air outlet nozzle 24 is preferably comprised of acetal copolymer. Alternatively, the air outlet nozzle 24 is comprised of either ABS or polycarbonate ABS.

The clamp fingers 42 and the first housing section 18 are preferably formed of Acetal M90 Natural Celcon or molded nylon.

The clamp sleeve 12 is preferably transparent, so as to facilitate viewing of the fingers 22 as they are tightened upon the air supply nozzle 30, in order to assure proper attachment of the air filter system 10 to the air supply nozzle 30 during the installation process. The fingers 42 are also preferably transparent, so as to facilitate viewing of the seal 16, so as to assure that the seal is properly compressed, i.e., so as to insure that the air supply nozzle is properly seated to the seal 16 in a manner which minimizes air leakage.

The first housing section 18 and/or the second housing section 22 are preferably transparent, so as to facilitate viewing of the filter medium 20. In this manner, a visual determination of the need to replace the filter medium 20 is easily performed.

Figure 6:
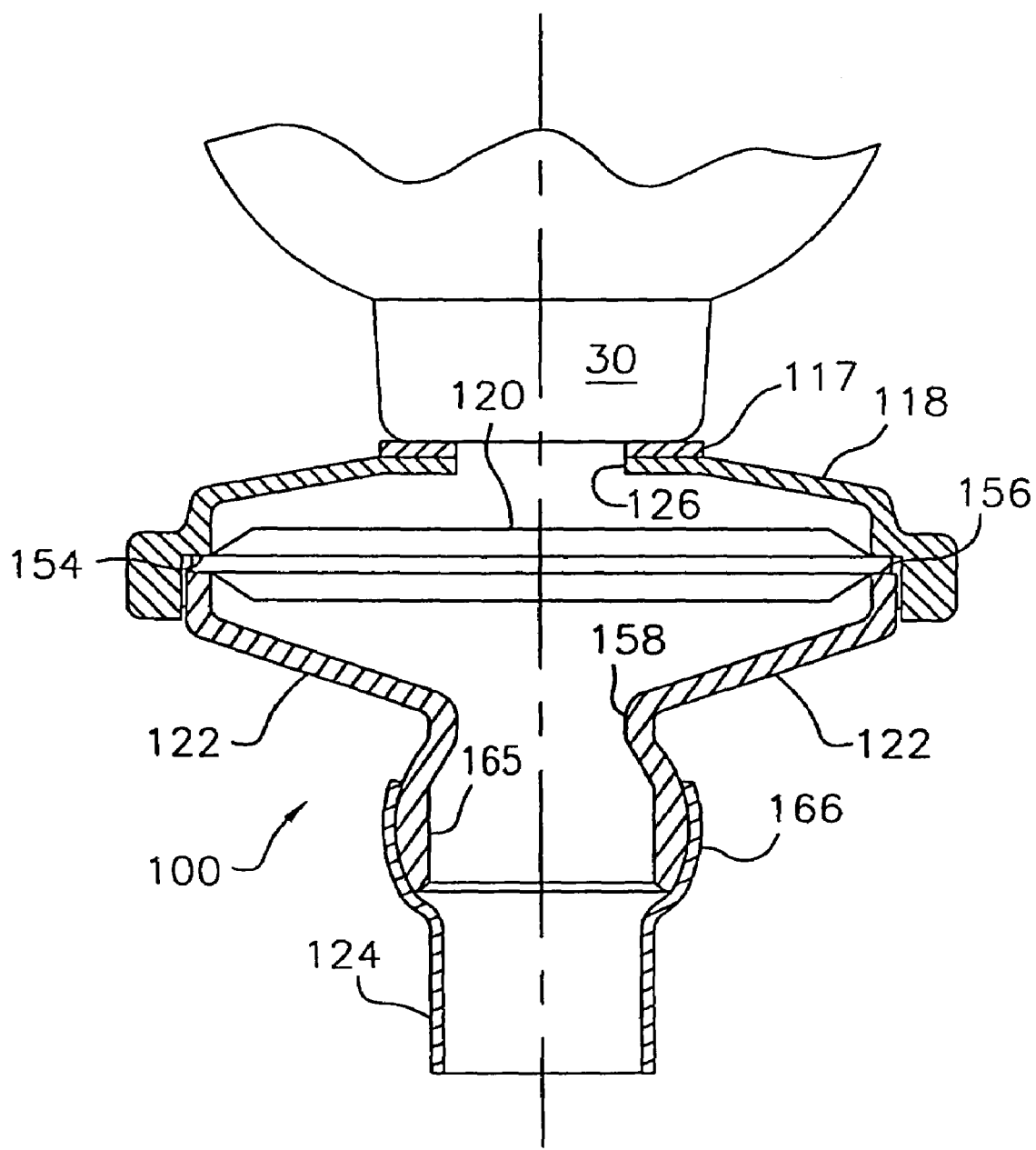
FIG. 6 is a semi-schematic, cross-sectional, side view of an alternative configuration of the air filter system, wherein the housing is attached to the air supply nozzle via adhesive bonding.

Referring now to FIG. 6, according to an alternative configuration, the air filter system 100 has a housing which comprises a first housing section 118 attached to a second housing section 122 and has a filter medium 120 captured between a shoulder 154 of the first housing section 118 and a shoulder 156 of the second housing section 122.

The first housing section 118 may be permanently attached, e.g., via adhesive bonding, ultrasonic welding, etc., to the second housing section 122. When the first housing section 118 is permanently attached to the second housing section 122, then the air filter system 100 is considered to be disposable, i.e., intended for only a limited number of uses.

Alternatively, the first housing section 118 may be removably attached, e.g., via threaded coupling or the use of fasteners, to the second housing section 122, so as to facilitate easy removal and replacement of the filter medium 120. Thus, for example, the first housing section 118 optionally comprises female threads and the second housing member 122 optionally comprises male threads which screw into the female threads of the first housing section 118, so as to capture the filter medium 120 between the first housing section 118 and the second housing section 122. The first 118 and second 122 housing sections may also be attached to one another via bayonet detents and the like.

The first housing section 118 has an opening 126 through which air from the air supply nozzle 30 is received. The second housing section 122 similarly has an opening 158 through which air exits the second housing 122. Air outlet nozzle 124 comprises a socket 166 which fits over and attaches to a complimentary ball 165 of the lower housing section 122, so as to facilitate desired aiming of the comparatively clean air output of the air filter system 100.

The air filter system 100 is attached to the air supply nozzle 30 of an airliner via adhesive bonding, such as by adhesive foam pad 117 which defines a seal or gasket. The adhesive foam pad 117 comprises a layer of foam material having pressure sensitive adhesive formed to at least one surface, i.e., the upper surface, thereof. Optionally, the foam material may have adhesive formed to both surfaces thereof, such that the foam material is attached to the upper housing 118 via adhesive bonding.

The adhesive foam pad 117 is preferably configured as a washer and preferably has sufficient thickness so as to provide a desired air seal between the air supply nozzle 30 and the air filter system 100 in spite of surface imperfections formed in the air supply nozzle 30 and/or the first housing section 118. That is, the foam adhesive pad 117 is sufficiently resilient to fill-in gaps between the air supply nozzle 30 and the first housing section 118, so as to inhibit air leakage therebetween.

Examples of pressure sensitive adhesives applied to the foam material include 3M 9425, 3M 9415, 3M COMMAND ADHESIVE, and Avery Corporation re-positional adhesives. The foam gasket 117 preferably has a thickness of between 0.015 inch and 0.150 inch, preferably, approximately 0.030 inch.

The air filter system 100 is preferably attached to a air supply nozzle 30 of an airliner by first removing a protective paper covering from the adhesive foam 117, so as to expose the adhesive thereof. The air filter system 100 is then pushed against the air supply nozzle 30, so as to cause the foam adhesive 117 to compress slightly and adhere to the air supply nozzle 30. Such compression of the foam adhesive 117 both assures adequate contact of the adhesive with the air supply nozzle 30, so as to provide reliable attachment of the air filter system 100 to the air supply nozzle 30, and also pushes the foam of the foam adhesive 117 into any gaps or other surface imperfections formed at the interface of the upper housing section 118 and the air supply nozzle 30, so as to mitigate air leakage therebetween.

After installation of the air filter system 100 to the air supply nozzle 30, the air outlet nozzle 124 thereof may be manipulated so as to direct air in a desired direction, such as upon the head and/or torso of the passenger. Air flow through the air filter system 100 may be controlled by rotating the air supply nozzle 30, so as to effect control of the butterfly valve associated therewith. The air supply nozzle 30 may be rotated either by grasping and turning the air supply nozzle 30 itself, or by grasping and turning the air filter system 100 of the present invention.

The first 118 and second 122 housing sections are preferably formed of clear polycarbonate, such as Lexan 940A. The air outlet nozzle 124 is preferably comprised of polycarbonate blended with Teflon. Alternatively, the first 118 and second 122 housing sections and air outlet nozzle 124 may be comprised of ABS. However, a person of ordinary skill in the art will readily recognize that the various components may be manufactured from a wide variety of prior art materials, which are considered to fall within the spirit and scope of the present invention.

The first 118 and second 122 housing sections are preferably transparent, so as to facilitate easy viewing of the filter medium 120, such that a need to replace the filter medium 120 or the entire air filter system 100 may easily be determined.

Figure 7:
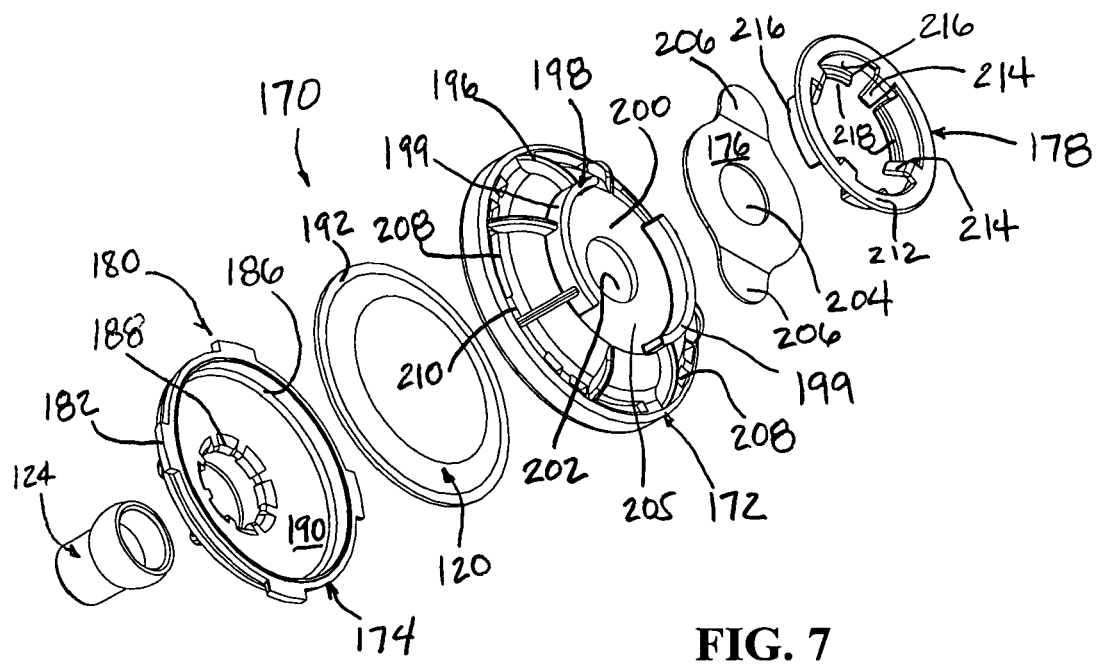
FIG. 7 is a semi-schematic exploded perspective view of another alternative embodiment of the air filter system, wherein the housing is attached to the air supply nozzle via adhesive bonding and has a centering ring.

Turning now to the exploded view of FIG. 7, there is shown another alternative air filter system provided in accordance with aspects of the present invention, which is generally designated 170. The air filter system 170 is similar to the air filter system 100 described above with reference to FIG. 6 in that it includes an air outlet nozzle 124, a two part housing which comprises an upper housing part 172 and a lower housing part 174, and a filter media 120. In addition, the filter system 170 uses an adhesive foam pad 176 to attach to an air supply nozzle (not shown) of a passenger compartment of, for example, an airplane, a bus, or a train. Also shown is a centering ring 178 for facilitating attachment and centering of the air filter system 170 to the air supply nozzle, as further discussed below.

Figure 8:
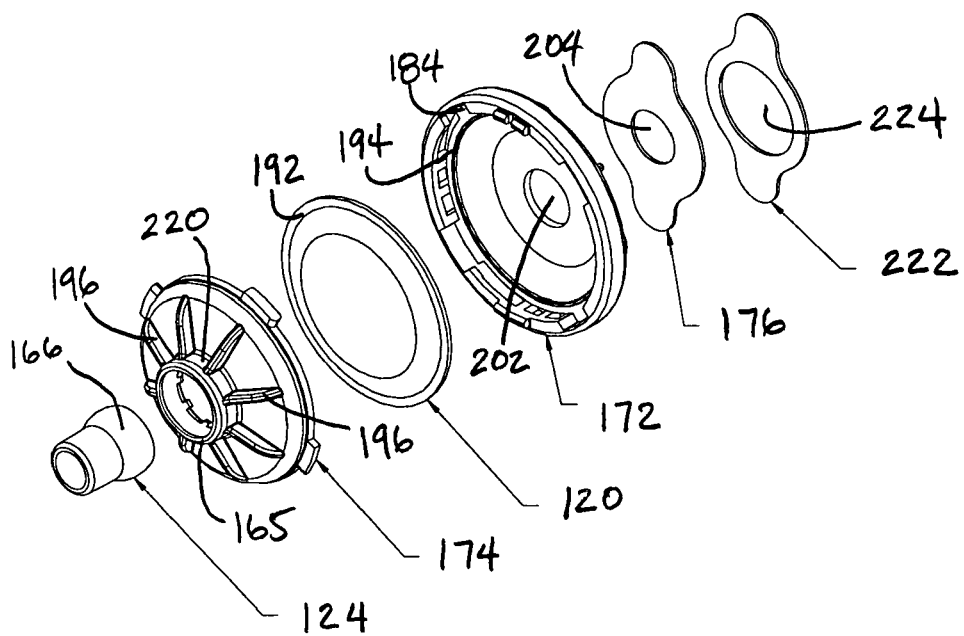
FIG. 8 is a semi-schematic exploded perspective view of FIG. 7 from a different perspective.

In one exemplary embodiment, the first and second housing sections 172, 174 are coupled together using bayonet detents 180. As shown in FIG. 7, the second housing section 174 incorporates a plurality of male detents 182 while the first housing section 172 incorporates a same corresponding number of female detents 184 (FIG. 8). A reverse detent arrangement whereby the upper or first housing section 172 incorporates a plurality of male detents and the second housing section 174 incorporates a same corresponding number of female detents may also be practiced without deviating from the spirit and scope of the present invention. Still alternatively, threads or engagement tabs may also be used to attach the two housing components together. Optionally, the two part housing sections may also be glued or welded together.

A shoulder 186 and optionally a plurality of flow guides or channels 188 may be incorporated in the interior cavity 190 of the second housing section 174. The shoulder 186 is configured to support the perimeter 192 of the filter media 120 when the same is placed thereon during assembly of the filter system 170. Together with a corresponding shoulder 194 on the first housing section (FIG. 8), the two shoulders 186, 194 on the upper and lower housing sections 172, 174 clamp or grip the perimeter 192 of the filter media 120 to firmly secure the same therein. In a preferred embodiment, the two shoulders 186, 194 each includes a circular protrusion or ring for facilitating pinching or clamping the perimeter 192 of the filter media 120. The circular protrusions enhance sealing of the filter media and minimize air bypass or leakage around the housing.

The filter media 120 preferably comprises a thin, generally circular filter element having an electrostatically charged polypropylene non-woven membrane commercially available for example from, e.g., American Filter Manufacturer and 3M). Alternatively or in addition thereto, the filter media may comprise a felt, carbon cloth (for removing VOC) available from Calgon Carbon, and cellulose media (for adding humidity) available from Whatman. However, various other manufacturers and media types are also useable herein without deviating from the spirit and scope of the present invention. As further discussed below, the filter media 120 and other components of the filter system 170 are disposable and replaceable.

In an exemplary embodiment, the first housing section 172 incorporates a plurality of reinforcing ribs 196 and a mounting guide member 198. As is well known in the art, the plurality of reinforcing ribs 196 add structural integrity and enhance gripping for housing disassembly and reassembly to the first housing section 172, which may be made from a thin plastic, such as from clear polycarbonate (e.g., Lexan 940A), polystyrene (e.g., KRO1 Clear Phillips), or ABS, with clear polycarbonate being more preferred. However, any number of hard plastic may be used to make the various components without deviating from the spirit and scope of the present invention. As shown in FIG. 8, the second housing section 174 also incorporates a plurality of reinforcing ribs 196 and is made from the same material as the upper housing section 172. Preferably, the upper and lower housing sections 172, 174 are transparent to facilitate easy viewing of the filter media 120. Optionally, the housing may have an opaque, semi-opaque, or a colored finish for aesthetic and marketing appeal.

In one exemplary embodiment, the mounting guide member 198 comprises two generally curvilinear wall structures 199 extending axially from a top mounting surface 200 of the first housing section 172, which comprises the inlet opening 202. The two wall structures 199 facilitate centering of the adhesive foam pad 176 when the same is placed therebetween so that the opening 204 of the foam pad 176 aligns with the inlet opening 202 of the mounting surface 200. In addition, the mounting guide member 198 facilitates centering of the air supply nozzle (See, e.g., FIG. 6) relative to the inlet opening 202. The curvilinear wall structures 199 each has a sufficient height or clearance over the top surface 200 of the housing to accommodate the thickness of the foam pad 176 and at least a portion of the air supply nozzle.

In one exemplary embodiment, the adhesive foam pad 176 comprises at least one or preferably a pair of tabs 206, which are without adhesive compounds. The tabs 206 provide gripping surfaces for applying and removing the foam pad 176 from the top mounting surface 200 of the filter housing. The tabs 206 should align with the two slots or gaps 205 between the two curvilinear wall structures 199 when the adhesive foam pad 176 is placed on the top mounting surface 200. The adhesive foam pad 176 preferably incorporates pressure sensitive adhesive formed on both the upper and lower surfaces of the foam pad. Exemplary foam pads are available from adhesive converting companies. Although not shown, peelable protective layers should be included to protect the adhesive until use.

In one exemplary embodiment, a plurality of pockets 208 are formed along the perimeter 210 of the first housing section 172. The pockets 208 are configured to facilitate the molding process, prevent sink marks and maintain constant material thickness, which are well known procedures in the molding art.

In a preferred embodiment, the centering ring 178 is incorporated for centering the opening of the air supply nozzle (See, e.g., FIG. 6) with the opening 204 of the adhesive foam pad 176 and the inlet opening 200. As further discussed below, the centering ring 178 ensures proper alignment between the air supply nozzle and the air filter system 170. However, the air filter system 170 will nonetheless filter air passed therethrough with or without the centering ring 178.

In one exemplary embodiment, the centering ring 178 comprises a flange 212 comprising a plurality of elongated independently articulated fingers 214 and a plurality of registration walls 216. The fingers 214 are integrally molded to the flange 212 and have fulcrums for flexing or bending. The plurality of fingers 214, more particularly the lowest most points of the fingers, form a generally circular configuration having a first dimension D1 for receiving an air supply nozzle (not shown). Thus, when an air supply nozzle, which has a second dimension D2 which is larger than the first dimension D1, is inserted into the centering ring, the fingers 214 are flexed outwardly and their resiliency produces a gripping force against the perimeter of the nozzle.

The registration walls 216 on the centering ring 178 are configured to register or align the placement of the centering ring relative to the mounting guide member 198 located on the top surface 200 of the first housing section 172. The registration walls 216 define a circumference sized to fit between the two curvilinear walls 199. To ensure a secured attachment between the centering ring 178 and the first housing section 172, in one exemplary embodiment, the base of the registration walls 216 each comprises a curvilinear tab 218. The curvilinear tabs 218 are configured to adhere with the adhesive foam pad 176 to thereby attach the centering ring 178 to the first housing section 172.

Alternatively or in addition thereto, the circumference defined by the plurality of registration walls 216 could be sized to have a friction or interference fit with the mounting guide member 198. Still alternatively or in addition thereto, the plurality of registration walls 216 and the mounting guide member 198 can incorporate detents for facilitating attachment.

FIG. 8 is a semi-schematic exploded perspective view of the filter system 170 of FIG. 7 from a different viewing angle. As shown, the second housing section 174 also incorporates a plurality of reinforcing and gripping ribs 196. The ribs are preferably evenly spaced around the exterior surface of the housing section 174 and is connected to part of the outlet nozzle 220. As previously discussed, the outlet nozzle 220 comprises a ball joint 165 for engaging with a socket joint 166 of the movable outlet nozzle 124. However, a reverse ball and socket arrangement may be incorporated wherein the movable outlet nozzle 124 incorporates a socket and the outlet nozzle 220 incorporates a ball joint.

Also shown in FIG. 8 is an alternative centering ring 222. In an exemplary embodiment, the alternative centering ring 222 has a same configuration as the adhesive foam pad 176 except for a larger opening 224 than the opening 204 of the adhesive foam pad. The larger opening 224 allows the alternative centering ring 222 to receive a circumference of an air supply nozzle to thereby center the opening of the air supply nozzle to the inlet opening 202 of the filter system 170. Once the air supply nozzle is received, its face contacts the adhesive foam pad 176 to firmly attach the air supply nozzle to the filter system 170. The alternative centering ring 222 may be made from plastic or plastic coated heavy gauged paper. When the alternative centering ring 222 is used, the height of the curvilinear walls 199 should be sufficiently high to accommodate certain gasper nozzles.

Referring now to FIG. 9 in addition to FIGS. 7 and 8, a semi-schematic partial side view partial cross-section view of the filter system 170 provided in accordance with aspects of the present invention adjacent an air supply nozzle 30 and receiving the air supply nozzle are shown. In the FIG. 9 drawing, the centering ring 178 of FIG. 7 is shown attached to the adhesive foam pad 176 of the upper housing section 172. In particular, there is shown an adhesive contact between the adhesive foam pad 176 and the curvilinear tabs 218 to secure the centering ring 178 to the top surface 200 of the upper housing section 172.

In the lower drawing of FIG. 9, the air supply nozzle 30 is shown inserted into the receiving space of the centering ring 178. The insertion causes the fingers 214 to flex radially outwardly and the face 226 of the nozzle 30 to contact the adhesive foam pad 176. At this point, the filter system 170 is secured to the nozzle 30 by the gripping force generated by the resiliency of the fingers 214 and the adhesive force of the adhesive foam pad 176.

Referring now to FIG. 10, a semi-schematic side view of the filter assembly 170 attached to the nozzle 30 is shown. Also shown are the tabs 206 of the adhesive foam pad 176, the flange 212 of the centering ring 178, the reinforcing and gripping ribs 196 on the housing, and the movable outlet nozzle 124. As discussed above, the attachment is achieved by pushing filter assembly 170 so that the air supply nozzle 30 fits into the receiving space provided by the centering ring 178.

To use the air filter system 170 to filter air, the nozzle 30 is first turned by grasping the two part air filter housing and turning the same in a direction to open the valve in the air supply nozzle 30. This may also be performed by grasping the central body portion 228 of the housing and turning the same.

Air then enters the air filter system 170 through the inlet opening 202 of the housing, passes through the filter media 120, and then out the movable outlet nozzle 124. The filtered air may be directed to a particular target by grasping the movable outlet nozzle 124 and pointing the same to direct air to a particular target. Alternatively, the ball and socket arrangement of the air supply nozzle 30 may be moved by grasping and moving the housing to direct air to a particular target. This alternative approach may be needed where, for example, the movable outlet nozzle 124 on the air filter system 170 is not incorporated or not functioning properly.

Referring now to FIG. 11, a semi-schematic partial perspective view of a package container 230 containing a replacement filter media pad 120 and a replacement adhesive foam pad 176 provided in accordance with aspects of the present invention is shown. In an exemplary embodiment, the package container 230 comprises a transparent plastic bag 232, and a hanging package header 234 comprising a hanging receptacle 236 for hanging the package container 230 on a hanging display pin (not shown). The package container 230 may be used to display components of the filter system 170 at a retail location, such as a retail shop at an airport terminal or a travel oriented store.

Although only a replacement filter media 120 and adhesive foam pad 176 are shown, the package container 230 may include other components. For example, the package container 230 may include the entire filter assembly 170 or any one or more of its components, such as replacement upper and lower housing sections, replacement moveable outlet nozzle, replacement adhesive foam pad, replacement filter media pad, and replacement centering ring.

To refurbish or change out one or more components of the filter system 170 of FIGS. 7–10, one or more package containers 230 at a retail location with the desired components to be replaced are first obtained. The filter system 170 is then disassembled and its components, such as the adhesive foam pad and/or media pad, removed. The replacement components acquired with the one or more package containers 230 are then replaced with the removed components and the filter assembly reassembled for a subsequent use.

Those skilled in the art will appreciate that various other materials are suitable for use in the construction of any configuration of the present invention. Generally, it is desirable that the air filter system of any configuration of the present invention be comprised of durable, preferably transparent plastic materials.

It is understood that the exemplary air filter system described herein and shown in the drawings represents only the presently preferred embodiments of the invention. Indeed, various modifications and additions may be made to such embodiments without departing from the spirit and scope of the invention. For example, although the housing of the air filter system of the present invention is described and shown as being generally circular in cross-section, those skilled in the art will appreciate the various other cross-sectional configurations are likewise suitable. For example, the air filter system of the present invention may instead have a cross-sectional configuration which is generally square, rectangular, triangular, hexagonal, octagonal, oval or any other desired shape.

Further, various different filter medium types are contemplated. A charcoal, ion exchange resin or other similar absorbent may be utilized so as to enhance removal of chemical contaminants. Indeed, any desired combination of filter mediums or types may of filter mediums be utilized.

Further, various different types of clamping mechanisms for attaching the air filter system of the present invention to an air supply nozzle or the like are contemplated. The clamping mechanism need not comprise a collet having fingers but rather may comprise any structure which effects clamping of the housing of the air filter system of the present invention to an air supply nozzle or the like. These and other modifications and additions may be obvious to those skilled in the art and may be implemented to adapt the present invention for a use in a variety of different applications.

What is claimed is:

1. An air filtration system for mounting to an air supply nozzle of a passenger compartment; the air filtration system comprising:
    a two-part housing comprising an upper housing part and a lower housing part; the upper and lower housing parts comprising an exterior surface and an interior surface and wherein the interior surface defines an interior cavity;
    a filter medium disposed in the interior cavity of the two-part housing;
    an inlet nozzle defining an opening having an inside diameter on the upper housing part; the diameter of the opening being smaller than an inside diameter of the air supply nozzle of the passenger compartment;
    an outlet nozzle disposed on the lower housing part; and
    an adhesive bonded to at least one of the exterior surface of the upper housing part proximate the inlet nozzle or the air supply nozzle of the passenger compartment.

2. The air filtration system of claim 1, wherein the upper and lower housing parts are attached to one another by detents.

3. The air filtration system of claim 1, wherein the upper and lower housing parts are attached to one another by adhesive bonding, by ultrasonic welding, or by threading.

4. The air filtration system of claim 1, wherein the outlet nozzle of the lower housing part comprises an extension such that an opening of the outlet nozzle is spaced apart from the exterior surface of the lower housing part.

5. The air filtration system of claim 1, wherein the adhesive is bonded to both the exterior surface of the upper housing part proximate the inlet nozzle and the air supply nozzle of the passenger compartment.

6. The air filtration system of claim 1, wherein the filter medium comprises an electrostatically charged polypropylene non-woven membrane.

7. The air filtration system of claim 1, further comprising an air directional nozzle attached to the outlet nozzle, wherein the air directional nozzle is moveable relative to the lower housing part.

8. The air filtration system of claim 4, further comprising an air directional nozzle attached to the extension of the outlet nozzle.

9. A method for filtering air discharged from an air supply nozzle of a passenger compartment comprising:
    attaching a two-part housing of an air filtration system comprising an upper housing part and a lower housing part to the air supply nozzle of the passenger compartment; the upper and lower housing parts comprising an exterior surface and an interior surface and wherein the interior surface defines an interior cavity;
    passing air from the air supply nozzle through the interior cavity of the two-part housing via an inlet nozzle disposed on the upper housing part; the inlet nozzle defining an opening having an inside diameter smaller than an inside diameter of the air supply nozzle;
    filtering the air by passing at least a portion of the air entered the inlet nozzle through a filter medium disposed in the interior cavity of the two-part housing;
    discharging the filtered air by directing the filtered air through an outlet nozzle disposed on the lower housing part; and
    wherein the attaching step comprises bonding at least one of the exterior surface of the upper housing part proximate the inlet nozzle and the air supply nozzle of the passenger compartment with an adhesive.

10. The method of claim 9, further comprising the step of bonding the adhesive to both the exterior surface of the upper housing part proximate the inlet nozzle and the air supply nozzle of the passenger compartment.

11. The method of claim 9, further comprising the step of separating the air filtration system from the air supply nozzle by separating the bonding from at least one of the exterior surface of the upper housing part proximate the inlet nozzle or the air supply nozzle of the passenger compartment.

12. The method of claim 9, wherein the upper housing part and the lower housing part are attached to one another by one of adhesive bonding, ultrasonic welding, detent engagement, or threading engagement.

13. The method of claim 9, wherein the filter medium comprises an electrostatically charged polypropylene non-woven membrane.

14. The method of claim 9, further comprising an air direction nozzle attached to the outlet nozzle of the lower housing part.

15. An air filtration device for filtering air discharged from an air supply nozzle of a passenger compartment comprising:
- a housing comprising an upper section and a lower section, the upper and lower sections comprising an exterior surface and an interior surface, which defines an interior cavity;
- a filter medium disposed in the interior cavity of the housing;
- an inlet nozzle disposed on the upper section, the inlet nozzle defining an opening on the upper section;
- an outlet nozzle disposed on the lower housing section; and
- wherein an adhesive is bonded to a portion of the exterior surface of the upper section proximate the inlet nozzle, and wherein the adhesive comprises a passage for passing air discharged from the air supply nozzle.

16. The air filtration device of claim 15, wherein the upper and lower sections are attached to one another by one of adhesive bonding, detent attachment, ultrasonic welding, or threaded engagement.

17. The air filtration device of claim 15, further comprising an air directional nozzle attached to the outlet nozzle of the lower section.

18. The air filtration device of claim 15, wherein the adhesive a two-sided a foam adhesive.

19. The air filtration device of claim 15, wherein the filter medium is removable from the housing.

20. The air filtration device of claim 17, wherein the air directional nozzle is attached to the outlet nozzle of the lower section by a ball and socket configuration.

21. An air filtration device for filtering air discharged from an air supply nozzle of a passenger compartment comprising:
- a two part filter housing comprising an upper housing section, a lower housing section, an exterior surface and an interior surface defining an interior cavity;
- a filter media disposed in the interior cavity;
- an inlet nozzle disposed on the upper housing section, the inlet nozzle defining an opening on the upper housing section;
- an outlet nozzle disposed on the lower housing section;
- an adhesive foam pad comprising a passage opening bonded to a portion of the exterior surface of the upper housing section proximate the inlet nozzle; and
- wherein the passage opening of the adhesive foam pad is generally centered with the inlet nozzle on the upper housing section by a mounting guide.

22. The air filtration device as recited in claim 21, wherein the upper housing section and the lower housing section are removably attached to one another.

23. The air filtration device as recited in claim 22, wherein the removable attachment comprises male detents and female detents.

24. The air filtration device as recited in claim 21, wherein the upper and lower housing sections each comprises a shoulder on an exterior surface.

25. The air filtration device as recited in claim 24, wherein the filter media is compressed along at least a portion of its perimeter by the shoulders of the upper and lower housing sections.

26. The air filtration device as recited in claim 21, further comprising a centering ring positioned over the adhesive foam pad.

27. The air filtration device as recited in claim 26, wherein the centering ring is adhered to the adhesive foam pad.

28. The air filtration device as recited in claim 27, wherein the centering ring comprises a plurality of fingers and a plurality of registration walls.

29. The air filtration device as recited in claim 28, wherein the air supply nozzle is adhered to the adhesive foam pad.

30. The air filtration device as recited in claim 29, wherein the air supply nozzle is gripped by the plurality of fingers.

31. The air filtration device as recited in claim 21, wherein the adhesive foam pad comprises an upper surface and a lower surface and wherein pressure sensitive adhesive is formed on at least a portion of both the upper and lower surfaces.

32. The air filtration device as recited in claim 31, wherein the adhesive foam pad comprises at least one gripping tab.

33. The air filtration device as recited in claim 21, wherein the mounting guide comprises two curvilinear walls.

34. The air filtration device as recited in claim 33, wherein the two curvilinear walls are integrally formed to the upper housing section.

35. An air filtration device for filtering air discharged from an air supply nozzle of a passenger compartment having an adhesive foam pad comprising a passage opening affixed to an exterior surface of a filter housing proximate an inlet opening with the passage operating generally aligned with the inlet opening, the air filtration system assembled from the steps comprising:
- obtaining a package container containing the adhesive foam pad, said adhesive foam pad comprising the passage opening, a first surface, a second surface, and adhesive on at least a portion of one of the first surface and the second surface;
- applying the adhesive foam pad on the filter housing comprising the inlet opening located on a generally flat portion of an upper housing section; and
- wherein the adhesive foam pad is applied such that the passage opening of the adhesive foam pad generally aligns with the inlet opening of the upper housing section.

36. The air filtration device as recited in claim 35, wherein the package container comprises a plastic bag.

37. The air filtration device as recited in claim 36, further comprising a replacement filter media.

38. The air filtration device as recited in claim 37, further comprising a replacement centering device.

39. The air filtration device as recited in claim 37, wherein the package container further comprises a hanging receptacle.

40. The air filtration device as recited in claim 35, wherein the adhesive comprises pressure sensitive adhesive.

41. The air filtration device as recited in claim 35, wherein the filter housing further comprises a lower housing section, and wherein the upper housing section is removably attached to the lower housing section.

42. The air filtration device as recited in claim 41, wherein the upper and lower housing sections define an interior cavity, and wherein a filter media is disposed in the interior cavity.

43. The air filtration device as recited in claim 42, wherein the filter media is clamped by a shoulder of the upper housing section and a shoulder of the lower housing section.

44. The air filtration device as recited in claim 42, wherein the package container further comprises a replacement filter media.

45. The air filtration device as recited in claim 41, wherein the removable attachment comprises male detents and female detents.

46. The air filtration device as recited in claim 41, further comprising a centering ring.

47. The air filtration device as recited in claim 46, wherein the centering ring is positioned over the replacement adhesive foam pad.

48. The air filtration device as recited in claim 47, wherein the centering ring comprises a central opening.

49. The air filtration device as recited in claim 47, wherein the centering ring comprises a plurality of fingers.

50. The air filtration device as recited in claim 41, further comprising a mounting guide disposed proximate the inlet opening for centering the replacement adhesive foam pad.

* * * * *